F. J. MERSFELDER ET AL

CLEAN-OUT PLUG

June 16, 1931.

Original Filed May 18, 1927

Re. 18,100

Inventors:
F. J. Mersfelder & Paul Balze
By their attorney Geo. H. Beale

Reissued June 16, 1931

Re. 18,100

UNITED STATES PATENT OFFICE

FREDERICK J. MERSFELDER AND PAUL BALZE, OF LEONIA, NEW JERSEY, ASSIGNORS TO M. & B. MANUFACTURING CO. INC., OF LEONIA, NEW JERSEY, A CORPORATION OF NEW JERSEY

CLEAN OUT PLUG

Original No. 1,702,878, dated February 19, 1929, Serial No. 192,357, filed May 18, 1927. Reissue No. 17,528, dated December 17, 1929, Serial No. 361,238, filed May 7, 1929, and subsequently became Reissue No. 17,667, dated May 13, 1930, Serial No. 432,885, filed March 3, 1930. This application for reissue filed February 4, 1931, Serial No. 513,402.

This invention relates to improvements in drainage clean out devices and has particular reference to detachable members used in connection with clean outs on drains.

The ordinary clean out, used in connection with drains, consists of a body in the nature of a hollow cylinder of a suitable size, into one end or side of which is fitted, by a screw thread, a brass plug. The body is usually made of iron and is caulked into the hub of the pipe or trap, leaving the brass plug removable for the purpose of cleaning the drain or trap. In many cases the brass plug is lost or broken requiring its replacement. Since the threaded portions of the body and plug vary somewhat as to their diameters from other bodies and plugs, it becomes very difficult to obtain the size of the new plug that will properly fit the body. In many cases it becomes necessary to remove the old body from the hub and to replace it with a new body for which the plug is furnished, but this replacement of the new body and plug involves much labor and expense.

Among the objects therefore of this present improvement is to provide a member such as a plug which will fit into threaded clean-out bodies of various diameters and which consequently will eliminate the necessity for replacing or renewing the body of the clean out when only a new plug is required. This object is attained by providing, for example, a new plug having a soft metal thread characterized by an excessive taper whereby the plug will fit threaded body openings of substantially varying diameters; and another object is to so form the thread or threaded surface portion of the new plug in an improved manner so that the normal yielding or conforming action of the soft metal may be increased.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof, reference is had to the accompanying drawings in which like reference characters designate the same parts in the several views, and in which—

Figure 1:
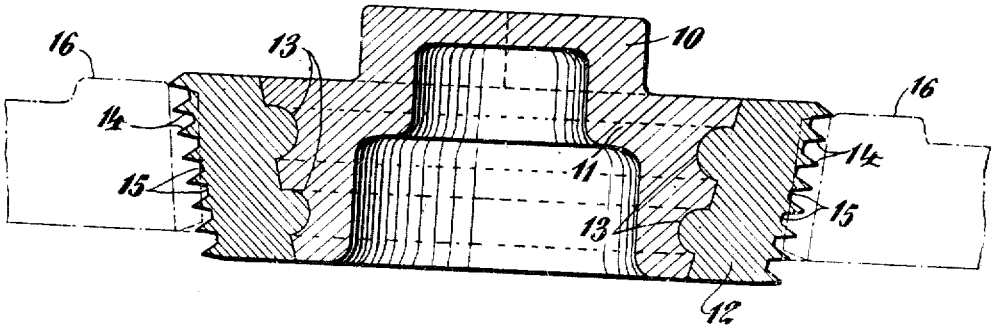
Figure 1 is a vertical sectional view of our improved clean out plug.
Figure 2:
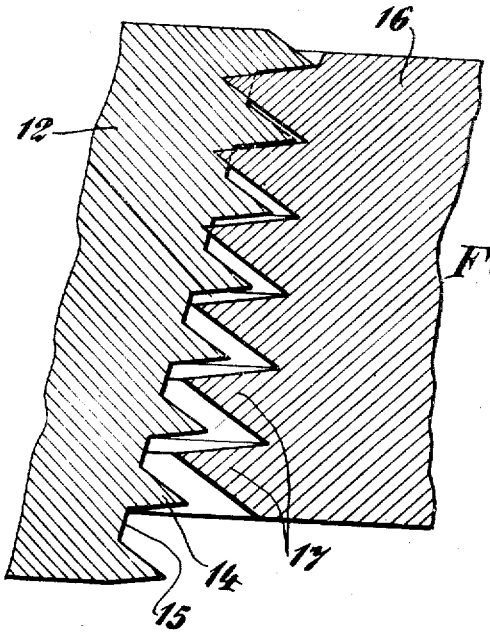
Fig. 2 is an enlarged sectional or fragmentary diagram indicating the relation of the clean out plug threads to the hard metal body structure.

Referring now more specifically to the drawings, we show at 10 a member such as a clean out plug which may comprise one or more parts, such as a core 11 of any suitable strong rigid metal such as cast iron and preferably hollow for cheapness and lightness, and a facing or collar 12 of a softer metal such as lead, a mixture of lead and antimony, or mixture of lead and tin, the collar being molded or cast or otherwise formed upon the periphery of the core 11. The core is preferably formed with suitable cavities of any desired shape into which the molten softer metal of the collar will enter during the process of formation of the collar upon the core.

It will be noted that the plug is so formed as to have a substantially greater taper than is usually found in clean out plugs or the like. Without intending to be unnecessarily limited to any particular dimensions in this regard, we suggest that the amount of taper should be in the proportion of about three inches to twelve inches in length of the plug. While the plug may be of any desired length it is preferably relatively short so as not to obstruct the interior of the clean-out body, and the number of threads of the plug may consequently be approximately equal to those on the body.

During the formation of the collar 12, a thread 14 may be cast thereon. This thread may be of any desired formation, but it is preferably of V-shape, sharp somewhat on top or on the outside, but substantially flat on the bottom or inside at 15.

16 indicates a fragment of a suitable hard metal body with which the plug is adapted to co-operate. These bodies are usually formed with suitable threads of the same general character as found on the plug, that is to say, of V-shape, and with relatively sharp tops and bottoms. The amount of taper in the body opening is materially less than that of the plug above described, and may be zero, and while the threads 17 of the body are practically uniform, the diameters of the openings in the bodies are by no means uniform or standard. It will be seen therefore that our new plug having an excessive taper may readily be driven or turned into the opening of the body 16 irrespective of a considerable variation in diameter of the body opening. The soft metal component of the plug has a wiping or yielding action with the hard metal of the drainage fitting, causing a tight joint even though a close engagement is afforded at only a small portion of the threaded surface. The plug taper assures a constantly increasing pressure at the tightly mating threads, affording a uniformly increasing combined pressure and wiping engagement, and the latter may increase into a yielding and intimate surface conforming condition. If a flat root be used, when the tapered plug is so driven into the body opening, the sharp pointed edges of the threads 17 will bite into the flat bottoms 15 of soft metal of the plug collar for a number of turns and thereby insure a tight and reliable connection between the plug and the body, and, moreover, making a connection which is separable from time to time as may be required for clean-out purposes and without disturbing the effective replacement capability of the plug. In either case, every time that our plug, upon removal, is reinserted into the clean-out body, the actions above mentioned may occur, in lesser degree than at the first engagement, but sufficiently to assure a perfect and in fact a constantly improved joint.

The invention finds especial advantage with reference to plumbing drainage fittings, as these are not generally made with standard size threads; in other words, fittings which would otherwise be of the same size, differ sufficiently in thread diameter so that the ordinary plug for one fitting will not engage another fitting. That difficulty, which is obviated by this invention, is indicative of one principle of our invention.

We claim:

1. The herein described fitting comprising a member having a uniform taper throughout the length thereof, the thread having a broad root of a different diameter than a thread to engage same, said member having a soft metal body to permit a new thread to be cut into the said root on engaging said member with a hard metal threaded member, the taper of the thread of the soft metal member being greater than that of the other member, the pitch of the angles of the sides of the thread being substantially the same for both members.

2. A closure member of the character set forth, including a core of hard metal, a layer of soft metal cast upon said core, said layer being threaded and having a substantially uniform taper throughout the length thereof, said thread having a broad root of a different diameter than that of a thread of a hard metal taper threaded device adapted to be engaged therewith, said broad root permitting a new thread to be cut into said root on engagement with said hard metal taper-threaded device, the taper of the first mentioned thread being greater than that of the thread of said device, and permitting the closure member to be used with hard metal threaded devices of different diameters.

3. A clean-out plug for drainage fittings having openings of substantially varying sizes to receive the plug, said plug having an outer threaded surface having a uniform taper greater in a substantial degree than that of the thread of the fittings, the threaded surface of the plug having a soft yielding metal component engageable under increasing pressure with successive threads of a portion of a threaded fitting opening to afford a liquid tight engagement with the fitting, said taper of the plug being sufficient to cause only a relatively small section of the plug to engage in said openings of substantially varying sizes.

4. In combination, a hard metal drainage fitting member having a threaded opening, and a plug member having an outer threaded surface to engage in said opening, one of said members having a soft metal layer along which its thread extends so that the entire thread of said one member has a yielding surface, the thread of one of said members having such substantially different taper than the thread of the other member, that only a fractional section of the plug is adapted to engage in said opening or in similar threaded openings of various sizes.

5. A member for threadedly engaging a threaded drainage fitting, said member having a soft metal thread having a substantially uniform taper greater in a substantial degree than that of the fitting thread, said soft metal thread having a flat root to be cut into by the thread of the fitting.

6. In combination, a plug having a tapered threaded outer surface and a member having a tapered threaded opening receiving said plug, said surface having approximately the same number of threads as said member, the taper of the threaded surface of said plug being so substantially different than the taper of said opening, that only a fractional section of the plug is adapted to engage in said threaded opening or in similar threaded openings of various sizes, whereby said plug may be used with members having threaded openings of substantially varying sizes.

7. A clean-out plug having a threaded outer surface adapted to be engaged with a drainage fitting having a tapered threaded opening for receiving said plug, the taper of the threaded surface of said plug being so sufficiently greater than the taper of said opening that only a fractional section of the plug may be engaged with said opening or with similar threaded drainage openings of various sizes.

8. A clean-out plug having a tapered threaded soft metal outer surface adapted to engage with a hard metal drainage fitting having a tapered threaded opening, and the plug having approximately the same number of threads as the latter, the taper of the thread of the plug being substantially greater than that of the said fitting opening to cause only a fractional part of the plug to engage in said opening or in similar openings of various sizes, whereby said plug may be used with fittings of various sizes.

9. A member having a tapered threaded soft metal surface for an element having a tapered threaded hard metal portion adapted to engage the member and make tight engagement therewith only at the engaging threads, the taper of the threaded surface of said member being so different to a large degree from the taper of said portion that only a fractional section of the member is engageable with the threaded element portion or with similar threaded element portions of various sizes.

10. A member having a tapered threaded soft metal surface for an element having a tapered threaded hard metal portion adapted to engage the member and make tight engagement therewith only at the engaging threads, the taper of the threaded surface of said member being so different to a large degree from the taper of the said portion that only a fractional section of the member is engageable with threaded element portions of various sizes, the thread of the member having a flat root to be cut into by the hard metal thread of the element.

In testimony whereof we affix our signatures.

PAUL BALZE.
FREDERICK J. MERSFELDER.

DISCLAIMER

Re. 18,100.—*Frederick J. Mersfelder* and *Paul Balze*, Leonia, N. J. CLEAN OUT PLUG. Patent dated June 16, 1931. Disclaimer filed July 8, 1935, by the assignee, *M. & B. Manufacturing Co., Inc.*

Hereby enters this disclaimer to claims 6 and 7 in said patent, which are in the following words, to wit:

"6. In combination, a plug having a tapered threaded outer surface and a member having a tapered threaded opening receiving said plug, said surface having approximately the same number of threads as said member, the taper of the threaded surface of said plug being so substantially different than the taper of said opening, that only a fractional section of the plug is adapted to engage in said threaded opening or in similar threaded openings of various sizes, whereby said plug may be used with members having threaded openings of substantially varying sizes.

"7. A clean-out plug having a threaded outer surface adapted to be engaged with a drainage fitting having a tapered threaded opening for receiving said plug, the taper of the threaded surface of said plug being so sufficiently greater than the taper of said opening that only a fractional section of the plug may be engaged with said opening or with similar threaded drainage openings of various sizes."

[*Official Gazette July 30, 1935.*]